(12) United States Patent
Henry et al.

(10) Patent No.: US 9,942,280 B2
(45) Date of Patent: Apr. 10, 2018

(54) DATA EXCHANGE SESSIONS USING GROUPS OF TERMINALS OF A FIRST USER AND AT LEAST ONE TERMINAL OF A SECOND USER

(75) Inventors: Katell Henry, Brest (FR); Yann Gestraud, Rennes (FR)

(73) Assignee: ORANGE, Paris (FR)

( * ) Notice: Subject to any disclaimer, the term of this patent is extended or adjusted under 35 U.S.C. 154(b) by 986 days.

(21) Appl. No.: 13/497,676

(22) PCT Filed: Sep. 21, 2010

(86) PCT No.: PCT/FR2010/051959
§ 371 (c)(1),
(2), (4) Date: Jun. 19, 2012

(87) PCT Pub. No.: WO2011/036390
PCT Pub. Date: Mar. 31, 2011

(65) Prior Publication Data
US 2012/0254449 A1      Oct. 4, 2012

(30) Foreign Application Priority Data
Sep. 22, 2009   (FR) .................. 09 56521

(51) Int. Cl.
| G06F 15/16 | (2006.01) |
| H04L 29/06 | (2006.01) |
| H04L 29/08 | (2006.01) |
| H04L 12/18 | (2006.01) |
| H04L 12/58 | (2006.01) |

(52) U.S. Cl.
CPC ...... *H04L 65/1069* (2013.01); *H04L 12/1818* (2013.01); *H04L 51/14* (2013.01); *H04L 65/1006* (2013.01); *H04L 65/1066* (2013.01); *H04L 65/1083* (2013.01); *H04L 65/4061* (2013.01); *H04L 67/14* (2013.01)

(58) Field of Classification Search
CPC .. H04L 67/14; H04L 65/1066; H04L 65/1083
USPC .......... 709/227–228, 202–203; 370/400–401
See application file for complete search history.

(56) References Cited

U.S. PATENT DOCUMENTS

| 5,541,927 A * | 7/1996 | Kristol | ............... H04L 12/1877 |
| | | | 370/256 |
| 7,310,665 B2 * | 12/2007 | Holler | ............... H04L 67/16 |
| | | | 709/223 |

(Continued)

OTHER PUBLICATIONS

International Search Report and Written Opinion dated Nov. 17, 2010 for corresponding International Application No. PCT/FR2010/051959, filed Sep. 21, 2010.

(Continued)

*Primary Examiner* — Bharat N Barot
(74) *Attorney, Agent, or Firm* — David D. Brush; Westman, Champlin & Koehler, P.A.

(57) ABSTRACT

A method, device, program, server and terminal are provided for monitoring a data-exchange session between first terminals belonging to a first user and at least one second terminal belonging to a second user. The method includes, after the first user receives an invitation to establish a session, creating a first group of the first terminals belonging to the first user suitable for enabling the session to be established with the first group.

14 Claims, 7 Drawing Sheets

(56) References Cited

U.S. PATENT DOCUMENTS

| | | | | |
|---|---|---|---|---|
| 7,474,669 | B2* | 1/2009 | Kamata | H04M 15/00 |
| | | | | 709/227 |
| 7,596,102 | B2* | 9/2009 | Forbes | H04M 3/42042 |
| | | | | 709/204 |
| 8,676,888 | B2* | 3/2014 | Xu et al. | 709/228 |
| 8,732,257 | B2* | 5/2014 | Nishibayashi | H04L 67/14 |
| | | | | 709/207 |
| 8,756,326 | B1* | 6/2014 | Elberse | H04L 67/02 |
| | | | | 709/227 |
| 9,319,484 | B2* | 4/2016 | Tanimoto | H04L 67/42 |
| 2006/0235981 | A1* | 10/2006 | Westman | H04L 65/4061 |
| | | | | 709/227 |
| 2006/0265451 | A1* | 11/2006 | Tomimori | H04L 65/4061 |
| | | | | 709/204 |
| 2007/0129051 | A1 | 6/2007 | Sing et al. | |
| 2008/0229390 | A1* | 9/2008 | Holm et al. | 709/203 |
| 2008/0281971 | A1* | 11/2008 | Leppanen et al. | 709/228 |
| 2010/0115106 | A1* | 5/2010 | Moriwaki | H04L 65/1069 |
| | | | | 709/227 |
| 2011/0246552 | A1* | 10/2011 | Nicholson | H04L 67/14 |
| | | | | 709/228 |
| 2013/0007290 | A1* | 1/2013 | Yang | 709/227 |

OTHER PUBLICATIONS

English Translation of the International Preliminary Report on Patentability and Written Opinion dated Apr. 3, 2012 for corresponding International Application No. PCT/FR2010/051959, filed Sep. 21, 2010.

* cited by examiner

DATA EXCHANGE SESSIONS USING GROUPS OF TERMINALS OF A FIRST USER AND AT LEAST ONE TERMINAL OF A SECOND USER

CROSS-REFERENCE TO RELATED APPLICATIONS

This application is a Section 371 National Stage Application of International Application No. PCT/FR2010/051959, filed Sep. 21, 2010, which is incorporated by reference in its entirety and published as WO 2011/036390 on Mar. 31, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to a method, a device, and a program for controlling a data exchange session between terminals of a first user and at least one terminal of a second user, to a participation method, device, and program, to a server, and to a terminal. In particular, the present disclosure relates to methods and devices implemented in a data exchange session between groups of terminals. In particular, the session is a so-called "multi-leg" session, i.e. a session that is made up of three sessions in series: two group sessions with the terminals respectively of the first and second users, and a session between the first and second users.

BACKGROUND OF THE DISCLOSURE

In the context of service architectures based on Internet protocol (IP) multimedia subsystem (IMS) architectures or on a session initiation protocol (SIP) core, when a user desires to receive a multimedia message on a plurality of terminals, the messaging server transfers the invitation to set up a session to each of the terminals. However the communications session is established with only one of the terminals: specifically, the first of the terminals to respond positively to the invitation (by a message of the 200 OK type). Consequently, the user can make use of only one of the terminals during the session.

In the push-to-talk context (an IP mobile conference) as described in particular by US 2007/0129051, a session is set up with a group of users by generating an invitation to set up a session that includes the identifier of the group. The method described does not make provision for being able to contact a given user over more than one of that user's terminals.

SUMMARY

In one aspect, an illustrative embodiment of the invention provides a method of controlling a data exchange session between first terminals of a first user and at least one second terminal of a second user, said control method comprising, after receiving an invitation to set up a session with said first user, creating a first group of first terminals of the first user suitable for enabling said session to be set up with said first group.

Thus, a session is established with a group of terminals of the first user.

The group is defined for the session. Thus, the non-pre-established group makes it possible in particular for the first user to change terminals, to generate a group of terminals belonging to the first user that are appropriate for the session that is being set up, etc.

In particular, depending on the preferences of the service supplier, the group may be built up on the fly depending on the desires of the user, or on the contrary it may be pre-established by default to all of the terminals of the user, e.g. by managing user preferences.

Advantageously, said first group is a function of a first list of first terminals obtained from said invitation to set up a session, with said first list taking the place of a first address of the first user.

Thus, the control method does not require a search to be made in various servers or other databases for the elements needed for this creation of a group, since it recovers the elements it needs for creating the group from the received invitation.

Advantageously, said control method includes supplying data received for the first user during the session to the first terminals belonging to said first group.

Thus, in the network, the session is a group session, i.e. data sent by the first user for all of the first terminals in the network transits only once, between the first messaging platform associated with the first user and the second messaging platform associated with the second user, thereby avoiding problems of overloading and saturating the network, and it is only from the control point that the data sent by the second user is distributed to each of the first terminals of said first group.

Advantageously, said control method includes supplying data sent by the first user during the session to the first terminals belonging to said first group.

Thus, the control point also distributes the data sent by the first user from one of that user's first terminals to each of the first terminals of said first group associated with said session. The distribution function is centralized for all of the data at the control point. If the first user desires to change between first terminals while a session is ongoing, there is no need to transfer data before making the changeover. All the data is already available.

Advantageously, said method includes displaying data sent by the first user during the session on the first terminals belonging to said first group.

Thus, not only is all of the data available, but there is no need to search for it on the terminal since it is already displayed.

Advantageously, said control method includes managing a history of data exchanges that is independent of the first terminals used by said first user for sending data.

Thus, if a user seeks to reread exchanges of various different sessions even though the user has not used the same first terminal for all of them, there is no need for the user to collect together the various histories from each of the first terminals used. Furthermore, this makes it possible to manage the history of a session during which the first user has made use of several different first terminals in order to send data, including when the first user has added or removed any of that user's first terminals, while a conversation was in progress.

Advantageously, in an implementation of the invention, the various steps of the method of an embodiment of the invention are implemented by a computer program or software, the software comprising software instructions for execution by a data processor of a control device forming a part in particular of a server and designed to control the execution of the various steps of the method.

Thus an embodiment of invention thus also provides a program comprising program code instructions for executing steps of the control method when said program is executed by a processor.

The program may use any programming language and may be in the form of source code, object code, or code intermediate between source code and object code, such as in a partially compiled form or in any other desirable form.

In another aspect, an embodiment of the invention provides a device for controlling a data exchange session between first terminals of a first user and at least one second terminal of a second user, said control device including means for setting up a session with said first user suitable for enabling said session to be set up with a first group of first terminals of the first user, said first group being created after receiving an invitation to set up a session with said first user.

An embodiment of the invention provides a participation method for enabling a first user in a data exchange session between first terminals of a first user and at least one second terminal of a second user, said participation method including modifying an invitation to set up a session with said first user, the modification being suitable for enabling said session to be set up with a first group of first terminals of said first user, said first group being created from said modified invitation.

Advantageously, said modification includes substituting an address of the first user with a list of first terminals in said invitation to set up a session with the first user.

Thus, the invitation to set up a session is destined not for one first terminal in particular but for the first user, thus making it necessary to create a first group of terminals by initially searching in a list of first terminals from which said first group is to be created.

Advantageously, in an implementation of the invention, the various steps of the method of an embodiment of the invention are implemented by a computer program or software, the software including software instructions for execution by a data processor of a participation device forming a part in particular of a server and being designed to control the execution of the various steps of the method.

An embodiment of the invention thus also provides a program including program code instructions for executing steps of the participation method when said program is executed by a processor.

The program may use any programming language and may be in the form of source code, object code, or code intermediate between source code and object code, such as in a partially compiled form or in any other desirable form.

An embodiment of the invention also provides a participation device for enabling a first user to participate in a data exchange session between first terminals of a first user with at least one second terminal of a second user, said participation device being characterized in that it includes means for modifying an invitation to set up a session with said first user, said means being suitable for enabling said session to be set up with a first group of first terminals of said first user, said first group being created from said modified list.

An embodiment of the invention also provides a device for storing preferences of a first user, the preferences comprising at least the identifiers of first terminals of said first user and at least one preference rule of said first user associated with an address of said first user and suitable for enabling said first session to be set up with a first group of first terminals of said first user, said first group being created from identifiers of said first terminals as a function of a first preference rule.

An embodiment of the invention also provides a server including at least control means for controlling a data exchange session between terminals of a first user and at least one terminal of a second user, said control means acting after receiving an invitation to set up a session with said first user to create a first group of first terminals of the first user suitable for enabling said session to be set up with said first group.

An embodiment of the invention also provides a terminal of a first user or of a second user including connection means suitable for sending an invitation to set up a data exchange session between a first user and a second user and suitable for enabling said session to be set up between a first group of first terminals of the first user and at least one second terminal of the second user, said first group being created as a result of said invitation being sent.

BRIEF DESCRIPTION OF THE DRAWINGS

The characteristics and advantages appear more clearly on reading the description given by way of example and from the associated figures, in which.

DETAILED DESCRIPTION OF ILLUSTRATIVE EMBODIMENTS

The data exchange session may be of any type, in particular a file transfer session, but also a session for setting up a conversation between two users: a first user U1 and a second user U2 (which conversation may be written and/or oral and/or videophone and/or multimedia, etc.). In particular, the description illustrates an embodiment of the invention in the context of conversation over an IP network, in particular in the context of converged messaging on an IP network, e.g. in application of the converged IP messaging (CPM) standard. The term "converged" is used to cover converging various types of messaging for different types of terminal such as, in particular, mobile telephones, personal computers (PCs), personal digital assistants (PDAs), and other IP communicating appliances giving a user access to messaging.

An embodiment of the invention makes use in particular of a protocol of the SIP type as shown in the following figures. However, more generally, an embodiment of the invention may be implemented using other session initiation protocols, in particular the extensible messaging and presence protocol (XMPP) for decentralized exchange of optionally instantaneous messages between clients, in the extensible markup language (XML) format as used in particular by the gtalk messaging device.

The various embodiments described below are implemented separately or in a combination with one or more of them.

Figure 1:
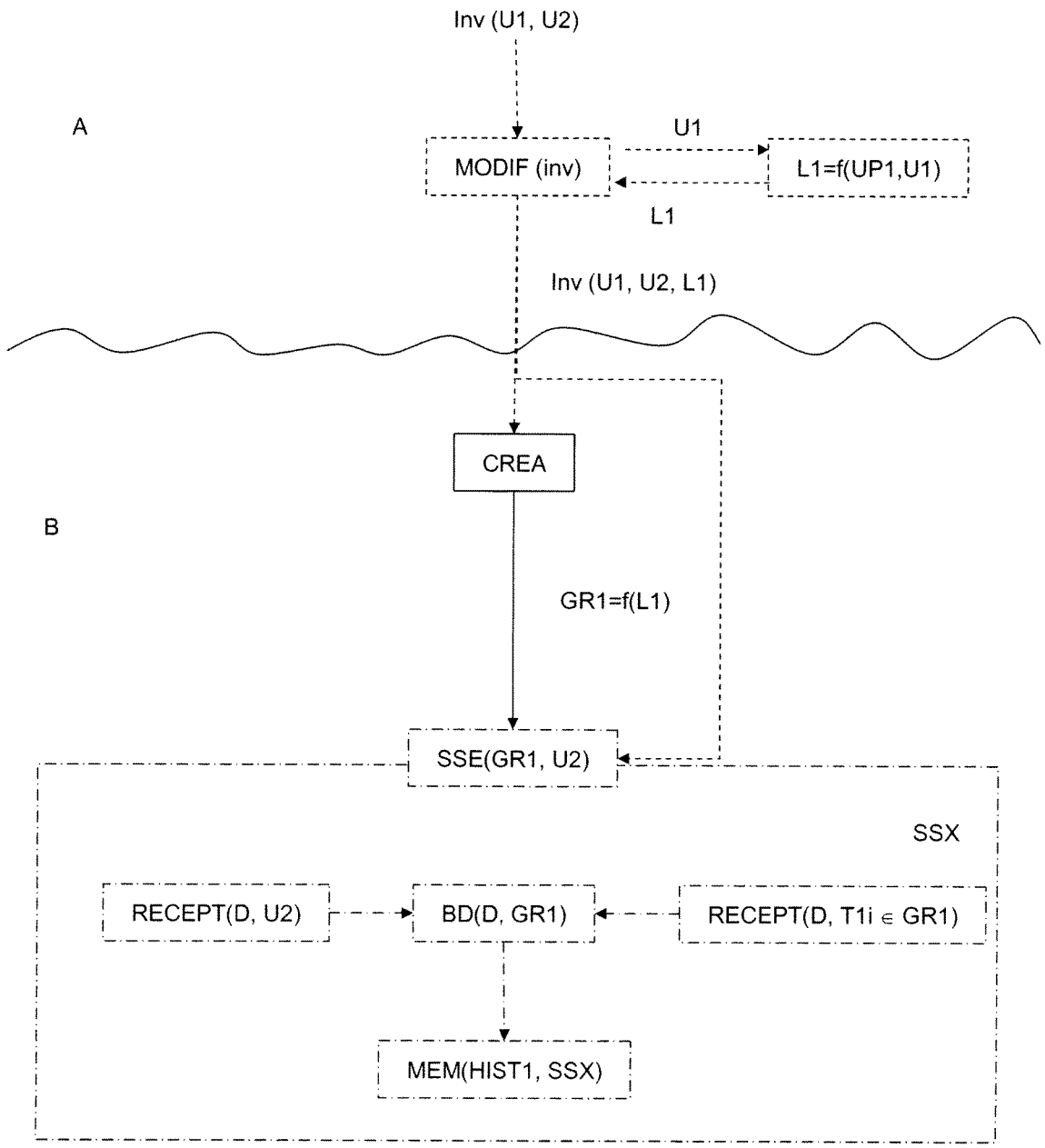
FIG. 1 is a block diagram of the control method of an embodiment of the invention.

FIG. 1 shows the methods implemented by an embodiment of the invention when setting up an SSX data exchange session and then during the SSX session itself.

In a particular embodiment, the invitation inv(U1, U2) by a first user U1 to a second user U2, or vice versa, is modified MODIF(inv) either during a control method of the session, or during a participation method implemented before the control method.

The modification is performed in particular on the basis of a first list L1 of first terminals determined as a function of preferences UP1 of the first user U1. For example, the address of the first user U1 is substituted by the first list L1.

In another particular embodiment, this substitution is performed by a first server AS1 associated with the first user U1 (shown in particular in FIGS. 4A to 4C) that either already knows the first list L1 of the first terminals of the first user U1, i.e. in preconfigured manner, e.g. in a first user preference module UP1, or else that recovers the list dynamically from another messaging server or from any other core device supporting the communications session to which the first terminals of the first user U1 have specified their states concerning connection and availability for communication.

The modified invitation inv(U1, U2, L1) is then processed by a session control method. The control method comprises creating a first group GR1 of first terminals suitable for enabling the session to be set up with the first group GR1.

In a particular embodiment, the first group GR1 is a function of the first list L1. Said first list is obtained from the modified invitation.

The setting up of the server-sent event (SSE) session thus comprises setting up a group session at least at the end of the first user U1 by using this first group GR1: SSE(GR1, U2).

During an SSX session, the control method includes supplying BD received data D for the first user U1 to the first group GR1, i.e. each of the first terminals of the first group GR1, on receiving RECEPT(D, U1) data D coming from the second user U2. Data is supplied in particular in real time or with a predetermined delay that is appropriate for the messaging service.

In a particular embodiment, the control method includes, during an SSX session, supplying, and optionally displaying, BD data D sent by the first user U1 to the first group GR1, i.e. each of the first terminals of the first group, on receiving RECEPT(D, T1i∈GR1) data D sent by a first terminal T1i of the first user U1 belonging to the first group GR1.

Thus, in a particular embodiment, the control method includes both controlling the setting up of the session and controlling the session as set up.

In a particular embodiment, the control method includes managing a history HIST1 of exchanges in a manner that is independent of the first terminals.

In a particular embodiment, not shown in FIG. 1, the control method implemented at the first user end acts when setting up the SSX session between the first and second terminals to set up two sessions:

a first session SSX1 between a first control device CF1 associated with the first user as shown in FIGS. 2 and 4A to 4C, and the first terminals of the first group GR1; and an intermediate session SSXi between a first control device CF1 associated with the first user and a second control device CF2 associated with the second user and shown in FIGS. 2 and 4A to 4C.

When setting up this SSX session between the first terminals and the second terminals, an equivalent control method at the second user end:

contributes to setting up the intermediate session SSXi; and sets up a second session SSX2 between a second control device CF2 associated with the second user and at least one second terminal, where appropriate, of a second group GR2.

The session is set up with at least one second terminal of a second user. The term "at least one" second terminal is used to mean, initially, one or more second terminals of the second user, in particular a first group of second terminals of the second user.

More generally, the session may be set up with $\underline{n}$ users. That is why the term "at least one" second terminal also covers one or more second to $n^{th}$ terminals of second to $n^{th}$ users, in particular one or more $i^{th}$ group(s) of $i^{th}$ terminals of $i^{th}$ user(s) (where $\underline{i}$ is an integer in the range 2 to $\underline{n}$).

To summarize, a control method comprises the following steps in particular:

when a first user U1 desires to set up a conversation with a second user U2, the first user sends an invitation to communicate by sending an invitation inv(U1, U2) to set up a messaging session, for example; and since each of the first and second users U1 and U2 possesses a plurality of terminals and desires to be able to receive messages and to answer them from any of their multiple terminals, the control method serves to avoid the present limits of techniques for setting up a group session between the first terminals of the first user U1, including in particular a first messaging server AS1 (shown in FIGS. 4A to 4C) of the first user U1, which first server AS1 sets up a "one-to-one" SSXi session (i.e. a point-to-point session with only one device involved at each end of the session) with a second server B, which creates a group session with the second terminals of the second user U2.

Figure 2A:
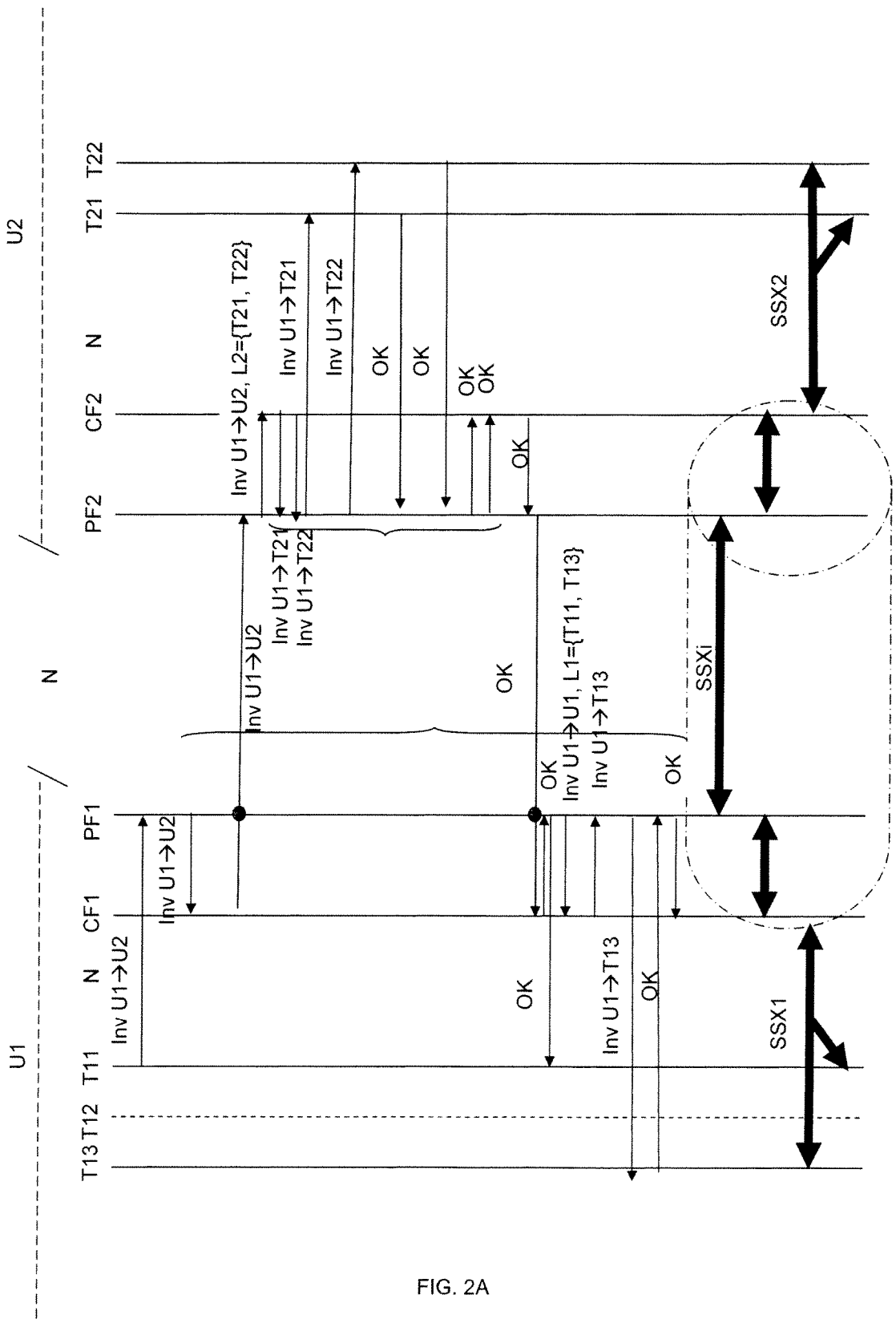
FIGS. 2A and 2B are diagrams of exchanges between various devices, and terminals in accordance with an embodiment of the invention, the devices being in particular control devices (associated with participation devices shown in FIG. 2A or implementing the participation method as shown in FIG. 2B)
Figure 2B:
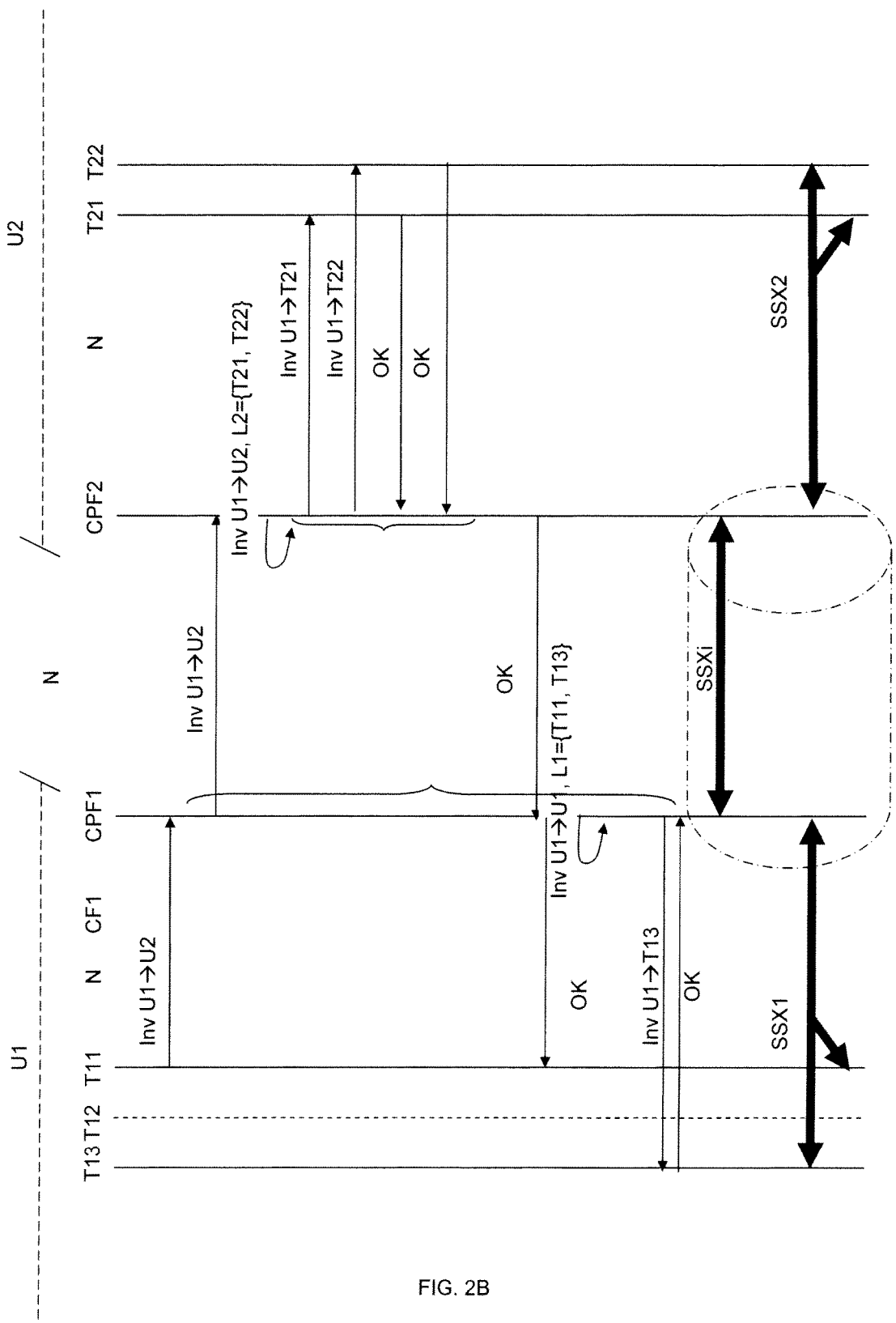

FIGS. 2A and 2B show the exchanges between various devices of a communications network while a first user U1 is setting up an SSX session, while using two of that user's terminals T11 and T13 for this SSX session with a second user U2, likewise using two terminals T21 and T22 for this SSX session. The various devices comprise respectively:

first and second control devices CF1 and CF2 and participation devices PF1 and PF2; and first and second control and participation devices CPF1 and CPF2 constituted in particular by control devices that serve to manage the conveying of session set-up invitations.

Initially, as shown in FIG. 2A, a first user U1, e.g. a CPM client, decides to enter into communication with a second user U2, e.g. another CPM client or a non-CPM client. The user U1 sends an invitation to an SSX messaging session to a second user U2: inv U1→U2 (e.g. a CPM session invitation: invite User 1=>User 2 in the SIP language). To do this, one of the terminals T11 of the user U1 sends the invitation inv U1→U2 to a first participation device PF1 associated with the first user U1.

In a particular embodiment, the first participation device PF1 acts in particular as a connection device between the messaging servers of two back-to-back user agent (B2BUA) operators. The first participation device PF1 then acts at this stage as a relay.

The invitation inv U1→U2 is then routed by the first participation device PF1 to a second participation device PF2 associated with the second user U2.

In a particular embodiment shown in FIG. 2A where the first participation device PF1 has the role of conveying invitations and a first control device CF1 has the role of sending invitations: the first participation device PF1 routes the invitation inv U1→U2 to a first control device CF1 that manages the sending of the session set-up invitation. This invitation is conveyed (as represented by the circle on the exchange arrow) by the first participation device PF1 to a second participation device PF2 associated with the second user U2.

For this purpose, in a particular embodiment, the first participation device PF1 implementing a CPM participating function performs the originating service control that is required and sends the invitation to a first SIP/IP core device (not shown) associated with the first user U1 that routes the invitation to a second SIP/IP core device (not shown) associated with the second user U2. Thereafter, the second SIP/IP core device routes the invitation to the second participation device PF2.

In a particular embodiment, the second participation device PF2 is identified by an address associated with the second user present in the invitation (in particular the CPM address in a CPM embodiment). Furthermore, in a variant embodiment, in addition to the address of the second user, identification requires the use of characteristics (e.g. a CPM feature tag) concerning the capabilities and the services of the second user, and more specifically of the second user's home network that includes the second participation device PF2, a second control device CF2, and at least one second terminal T21, T22. In particular, these characteristics are available in control messages of the session exchange service or CPM service.

The second participation device PF2 receives the invitation inv U1→U2 from the first participation device PF1. The second participation device PF2 acts as a connection device between messaging servers of two B2BUA operators.

For this purpose, in a particular embodiment, the second participation device PF2 implementing a CMP participating function executes the terminating service control that is needed and receives the invitation from the second SIP/IP core device (not shown).

On the basis of the preferences of the second user U2, the second participation device PF2 verifies all of the registered addresses of the second terminals T21, T22 of the second user U2 and sends an invitation including the second list of second terminals L2 participating in the session to a second control device CF2 associated with the second user U2: inv U1→U2, L2={T21, T22} (invite User 1=>User 2, devices1&2 in SIP language). In a particular embodiment, this invitation is an ad-hoc group invitation.

The second control device CF2 creates a second group of second terminals GR2=T21, T22 by sending invitations to each of the second terminals concerned, respectively inv U1→T21, inv U1→T22.

In a particular embodiment shown in FIG. 2A, the second control device CF2 sends the invitations to each of the second terminals concerned, respectively inv U1→T21, inv U1→T22, to the second participation device PF2, which conveys them to the second terminals concerned T21 and T22.

In a particular embodiment, these invitations make it possible to create an ad-hoc group conference with the various second terminals T21 and T22 of the second user U2.

In a particular embodiment, the session is set up only when the various terminals and devices involved in a session have accepted the invitation. In particular, as shown in FIG. 2A, the second terminals T21 and T22 accept the invitation with a reply of the OK type (or 200 OK in SIP language) sent to the first user U1. These OK replies are initially received by the second participation device PF2 which conveys them to the second control device CF2 which routes a reply to the second group, i.e. for the second user U2 to the second participation device PF2, which sends it to the first participation device PF1, which conveys it to the first control device CF1.

In a particular embodiment, the second SIP/IP core device receives the OK reply from the second participation device PF2 and sends it to the first SIP/IP core device which routes it to the first participation device PF1.

In the particular embodiment of FIG. 2A, the first control device CF1 then manages the sending of invitations for the terminals of the first user U1. Initially, the first control device replies OK to the first terminal T11 initiating the session. This reply is conveyed by the first participation device PF1.

On the basis of the preferences of the first user U1, the first participation device PF1 verifies all of the registered addresses of the first terminals T11, T12, T13 of the first user U1 and sends an invitation including the list L1 of the first terminals that are participating in the session to a first control device CF1 associated with the first user U1: inv U1→U1, L1={T11, T13} (invite User 1=>User 1, devices1&3 in SIP language). In a particular embodiment, this invitation is an ad-hoc group invitation.

The first control device CF1 creates a first group of first terminals GR1=T11, T13 by sending invitations to each of the first terminals concerned, respectively inv U1→T13. In the particular embodiment of FIG. 2A, the invitations do not include the first terminal T11 initiating the session. The invitation inv U1→T13 is sent to the first participation device PF1 which conveys it to the first terminating terminal T13.

In a particular embodiment, these invitations enable an ad-hoc group conference to be created with the various first terminals T11 and T13 of the first user U1.

During the SSX session as set up in this way, data is exchanged between the first and second control devices CF1 and CF2 and is displayed on all of the first and second terminals T11, T13 and T21, T22.

In a particular embodiment, the SSX session is subdivided into three sessions:

a first session SSX1, referred to as the "group" session, between the first group GR1 and the first control device CF1;

an intermediate session SSXi between the first control device CF1 and the second control device CF2; and a second session SSX2, referred to as a "group" session, between the second group GR2 and the second control device CF2.

In this particular embodiment, the first participation device PF1 sends:

an invitation inv U1→U1, L1={T11, T13} for setting up the first session SSX1 to the first control device CF1; and an invitation inv U1→U2 for setting up the intermediate session SSXi to the second participation device.

The second participation device PF2 relays this invitation as an invitation inv U1→U2, L2={T21, T22} for setting up the second session SSX2 to the second control device CF2.

The invitations inv U1→T11, inv U1→T13 from the first control device CF1 to the first terminals of the first group GR1 participate in setting up the first session SSX1. And the invitations inv U1→T21, inv U1→T22 from the second control device CF2 to the second terminals of the second group GR2 participate in setting up the second session SSX2.

As shown in FIG. 2B, a first user U1 sends an invitation to an SSX messaging session to the first user U2: inv U1→U2. To do this, one of the terminals T11 of the first user U1 sends the invitation inv U1→U2 to a first control and participation device CPF1 associated with the first user U1.

The invitation inv U1→U2 is then routed by the first control and participation device CPF1 to a second control and participation device CPF2 associated with the second user U2.

The second control and participation device CPF2 receives the invitation inv U1→U2 from the first control and participation device CPF1. The second control and participation device CPF2 acts as a connection device between the messaging servers of two B2BUA operators.

On the basis of preferences of the second user U2, the second control and participation device CPF2 verifies all of the registered addresses of the second terminals T21, T22 of the second user U2 and determines a second list of the second terminals L2 participating in the session.

The second control and participation device CPF2 creates a second group of second terminals GR2=T21, T22 by sending invitations to each of the second terminals concerned, respectively inv U1→T21, inv U1→T22.

In a particular embodiment, these invitations make it possible to create an ad-hoc group conference with the various second terminals T21 and T22 of the second user U2.

On the basis of preferences of the first user U1, the first control and participation device CPF1 verifies all of the registered addresses of the first terminals T11, T12, T13 of the first user U1 and determines a list L1 of the first terminals participating in the session.

The first control and participation device CPF1 creates a first group of first terminals GR1=T11, T13 by sending an invitation to each of the first terminals concerned, respectively inv U1→T13. In the particular embodiment of FIG. 2B, the invitations do not include the first terminal T11 that has initiated the session.

In a particular embodiment, this invitation serves to create an ad-hoc group conference with the various first terminals T11 and T13 of the first user U1.

During the SSX session as set up in this way, data is exchanged between the first and second control devices CF1 and CF2, and it is displayed on all of the first and second terminals T11, T13 and T21, T22.

In a particular embodiment, the SSX session is subdivided into three sessions:

a first session SSX1, referred to as a "group" session, between the first group GR1 and the first control and participation device CPF1;

an intermediate session SSXi between the first control and participation device CPF1 and the second control and participation device CPF2; and a second session SSX2, referred to as a "group" session, between the second group GR2 and the second control and participation device.

Figure 3:
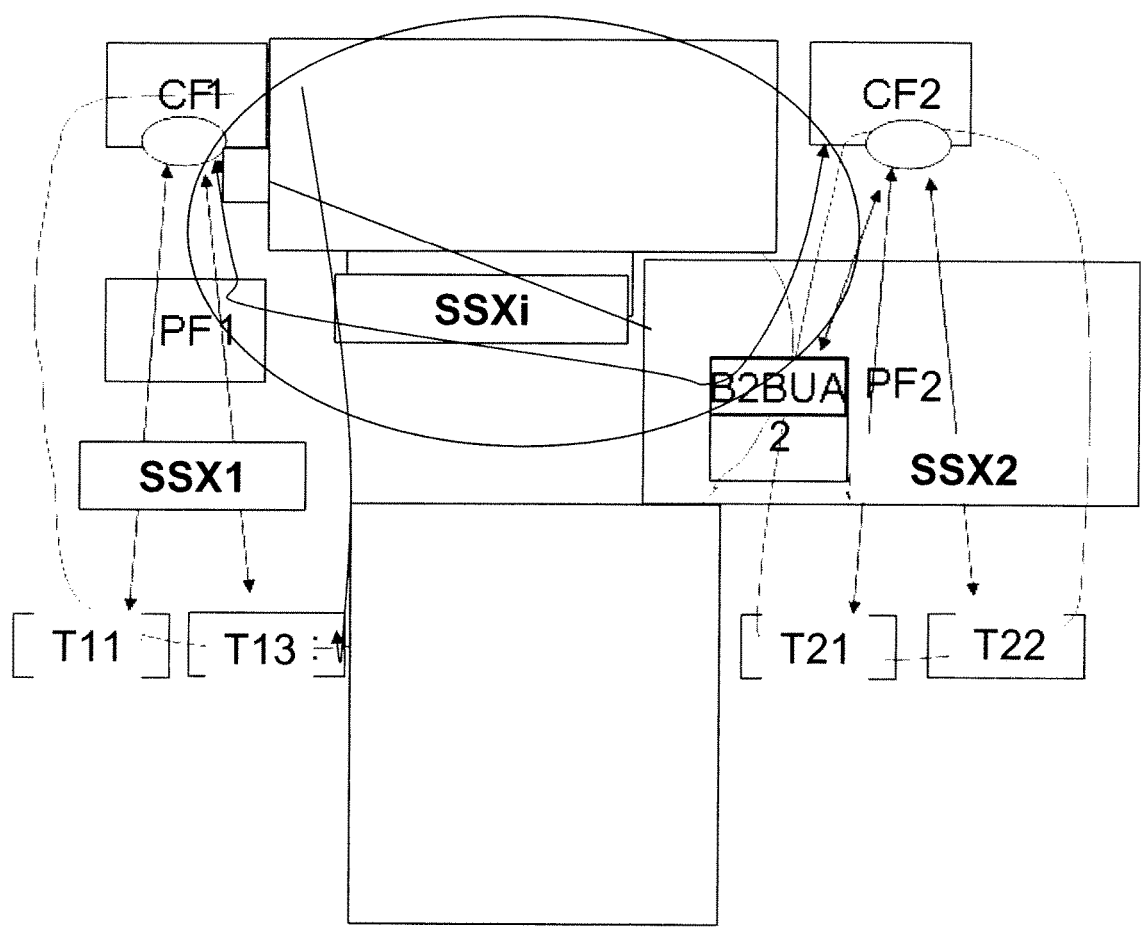
FIG. 3 is a simplified diagram of a communications system implementing devices of an embodiment of the invention.

FIG. 3 shows in simplified manner a communications system implementing an embodiment of the invention. The first user U1 is represented by the first user's first terminals T11 and T13, a first participation device PF1, and a first control device CF1. The second user U2 is represented by the second user's second terminals T21 and T22, a second participation device PF2, and a second control device CF2.

The first and second control devices CF1 and CF2 respectively manage the first and second group sessions SSX1 and SSX2 respectively via the first and second participation devices PF1 and PF2. The first and second control devices CF1 and CF2 also manage the intermediate session SSXi: a point-to-point session with the second user U2. This session is conveyed by the first and second participation devices PF1 and PF2 to the second control device. In the particular embodiment of FIG. 3, since the SSX session was initiated by the first user U1, the second participation device PF2 acts in B2BUA.

Figure 4A:
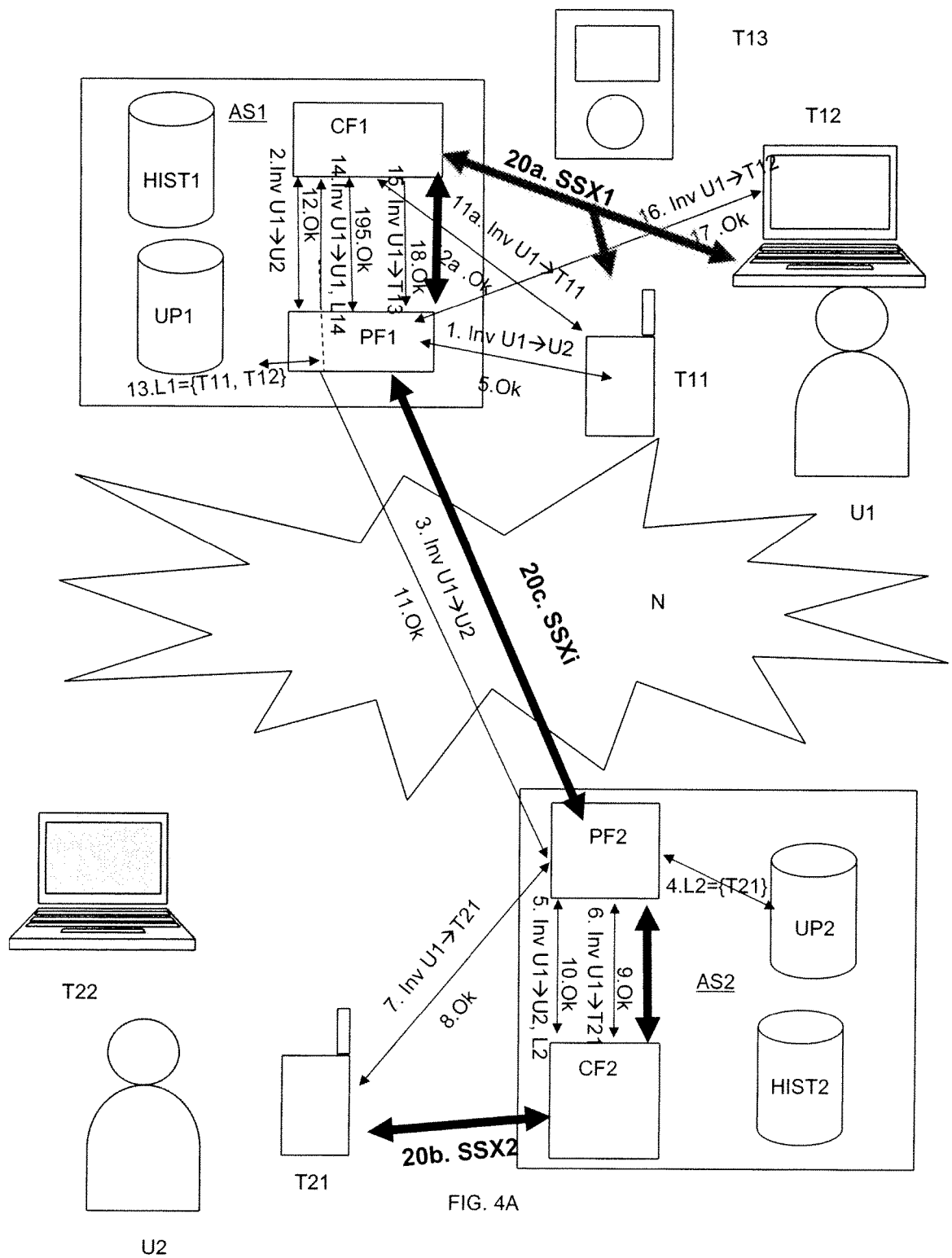
FIG. 4A shows a first user U1 using a plurality of terminals setting up a session with a user U2 using a single terminal, the session being set up by implementing control devices, servers, and terminals of an embodiment of the invention.

FIG. 4A shows the situation of two users, both using a plurality of terminals: a first user U1 using a plurality of first terminals T11, T12 enters into communication with a second user U2 using a plurality of second terminals T21, T22, T13.

An invitation 2.inv U1→U2 (in particular a CPM session invitation) is routed from an inviting first server AS1 associated with a first user U1 (in particular a first network serving the inviting first CPM user U1) to a second server AS2 associated with an invited second user U2 (in particular a first network serving the invited second CPM user).

Session Initiation

Inviting Server AS1

In order to set up a messaging session, in particular a CPM 1-1 session, the inviting client, specifically the first terminal T11 of the first user U1 in FIG. 4A (known as the inviting CPM client) sends an invitation 1.inv U1→U2 to the first server AS1.

In a particular embodiment, a CPM session invitation is sent to a first SIP/IP core device (not shown) serving the inviting first user U1, in particular to a first SIP/IP core device of the inviting first user AS1.

In a second particular embodiment, the invitation 1.inv U1→U2 that is sent includes characteristics about the capabilities and the services of the destination user, specifically a session user U2 (e.g. in the form of a CPM feature tag). These characteristics are used by the first server AS1 (in the particular embodiment described above, the second core device) to route the invitation to a first participation device PF1 associated with the inviting first user U1. These characteristics are introduced into the invitation by the client, specifically the first terminal T11 of the inviting first user U1.

The invitation 1.inv U1→U2 includes the address of the invited second user U2, e.g. a CPM user or a non-CPM user.

This address is introduced into the invitation by the client, specifically by the first terminal T11 of the inviting first user U1.

In a particular embodiment, the first participation device PF1 of the first server AS1 receives the invitation 1.inv U1→U2.

In a particular embodiment, the first participation device PF1 includes determination means for acting on the basis of the received invitation to determine whether the first participation device PF1 is or is not to continue with setting up the session.

In a particular embodiment, the first participation device PF1 includes routing means to an interworking selection device if interworking is involved in setting up the session, on the basis of the invitation as received. In particular, the routing means are suitable for enabling routing to the interworking selection device via a second SIP/IP core device. Interworking occurs in particular when one of the users does not use the same messaging service: for example the inviting first user U1 is a CPM user, while the destination second user U2 is not.

The first participation device PF1 includes firstly routing means for routing the invitation received to an invited second user U2 on the basis of the received invitation. In a particular embodiment, the invitation 2.inv U1→U2 is routed via a second SIP/IP core device associated with the invited second user U2.

In a particular embodiment, the first participation device PF1 decides whether or not it is to remain in the media path for this session. This decision is taken in particular as a function of service provider policies.

The first participation device PF1 includes secondly routing means that act after receiving the invitation to route a modified invitation 10.inv U1→4U1, L1 (e.g. including the previously-determined addresses of the first terminals T11, T12) to a first control device CF1 of the inviting first user U1, in particular via an SIP/IP core device.

In a particular embodiment, the first participation device PF1 includes means for modifying an invitation, specifically the received invitation 1.inv U1→U2, suitable for enabling a session to be set up with a first group of first terminals, said first group being created on the basis of the modified invitation 10.inv U1→U1, L1.

In a particular embodiment, the first participation device PF1 determines the first terminals (in particular CPM client) that are not to receive the invitation as a function of criteria such as, in particular: the media streams on offer in the invitation, the capabilities of the first terminals, the preferences of the first user UP1, and the service provider policies.

The first control device CF1 includes means for setting up a session with a first group GR1 of first terminals that is created after receiving the invitation 10.inv U1→U1, L1. In particular, and as shown in FIG. 4A, the first control device CF1 includes means for routing the invitation to each of the first terminals T11, T12 that are concerned, in particular via the first SIP/IP core device, respectively 11a.inv U1→T11, 11b.inv U1→T12.

In particular, the first control device CF1 includes means for creating a group of terminals, in particular an ad-hoc group, or for using a predefined group with all of the addresses of the first terminals T11, T12 of the invited first user U1.

Invited Server AS2

The second participation device PF2 of the second server AS2 associated with the invited second user U2 receives the invitation 2.inv U1→U2. In a particular embodiment, a second core device associated with the invited second user U2 routes the invitation 2.inv U1→U2 to the second participation device PF2. This routing is performed in particular on the basis of characteristics (in particular a CPM feature tag) inserted in the invitation.

In a particular embodiment, the second participation device PF2 includes means for verifying the messaging service from which the address of the second user U2 depends on receiving the invitation 2.inv U1→U2.

The second participation device PF2 includes means for rejecting the invitation on the basis of the received invitation. In a particular embodiment, it is decided to reject the invitation if:

the preferences UP2 of the second user U2 provide for rejecting session invitations (e.g. on the basis of the originating address, non-disclosure of the identity of the sender, or a request for media streaming); and/or no second terminal is registered in particular for the type of messaging service specified by the invitation (in particular no CPM client registered for the receiving second user U2).

In a particular embodiment, the second participation device PF2 includes means for verifying the preferences UP2 of the second user UP2 on the second terminals to which the invitation is to be routed if a plurality of second terminals are registered.

The second participation device PF2 includes means for modifying an invitation, specifically the received invitation 2.inv U1→U2, and suitable for setting up a session with a second terminal, 4.inv U1→U2, L2.

In a particular embodiment, the second participation device PF2 determines the second terminals (in particular CPM clients) that are not to receive the invitation as a function of criteria such as, in particular: the media streams offered in the invitation, the capabilities of the first terminals, the preferences of the second user U2, and the service provider policies.

In a particular embodiment, the second participation device PF2 includes means for acting on the basis of the received invitation to determine whether the second participation device PF2 should or should not continue with setting up the session.

If the session is to continue being set up, then the second participation device PF2 acts as a connection device between the messaging servers of the two B2BUA operators.

In the example of FIG. 4A, the second participation device PF2 of the invited second user U2 sends the modified invitation 4.inv U1→U2, L2 (e.g. including the addresses of the previously-determined second terminal T21) to a second control device CF2 of the invited second user U2, in particular via a second SIP/IP core device.

The second control device CF2 includes means for setting up a session with a second group GR2 of second terminals, which group is created after receiving the invitation 4.inv U1→U2, L2. In particular, and as shown in FIG. 4C, the second control device CF2 includes means for routing the invitation to the second terminal T21 concerned, in particular via the second SIP/IP core device, respectively 5.inv U1→T21.

In particular, the second control device CF2 includes means for creating a group of terminals, in particular an ad-hoc group, or for using a predefined group with all of the addresses of the second terminal T21 of the invited second user U2.

In a particular embodiment, the second control device CF2 includes means for routing to an interworking selection device, if that is needed for the second terminal T21, in particular if interworking is involved in setting up the session, with this being done on the basis of the received invitation. In particular, the routing means are suitable for enabling routing to the interworking selection device via a first SIP/IP core device.

Figure 4B:
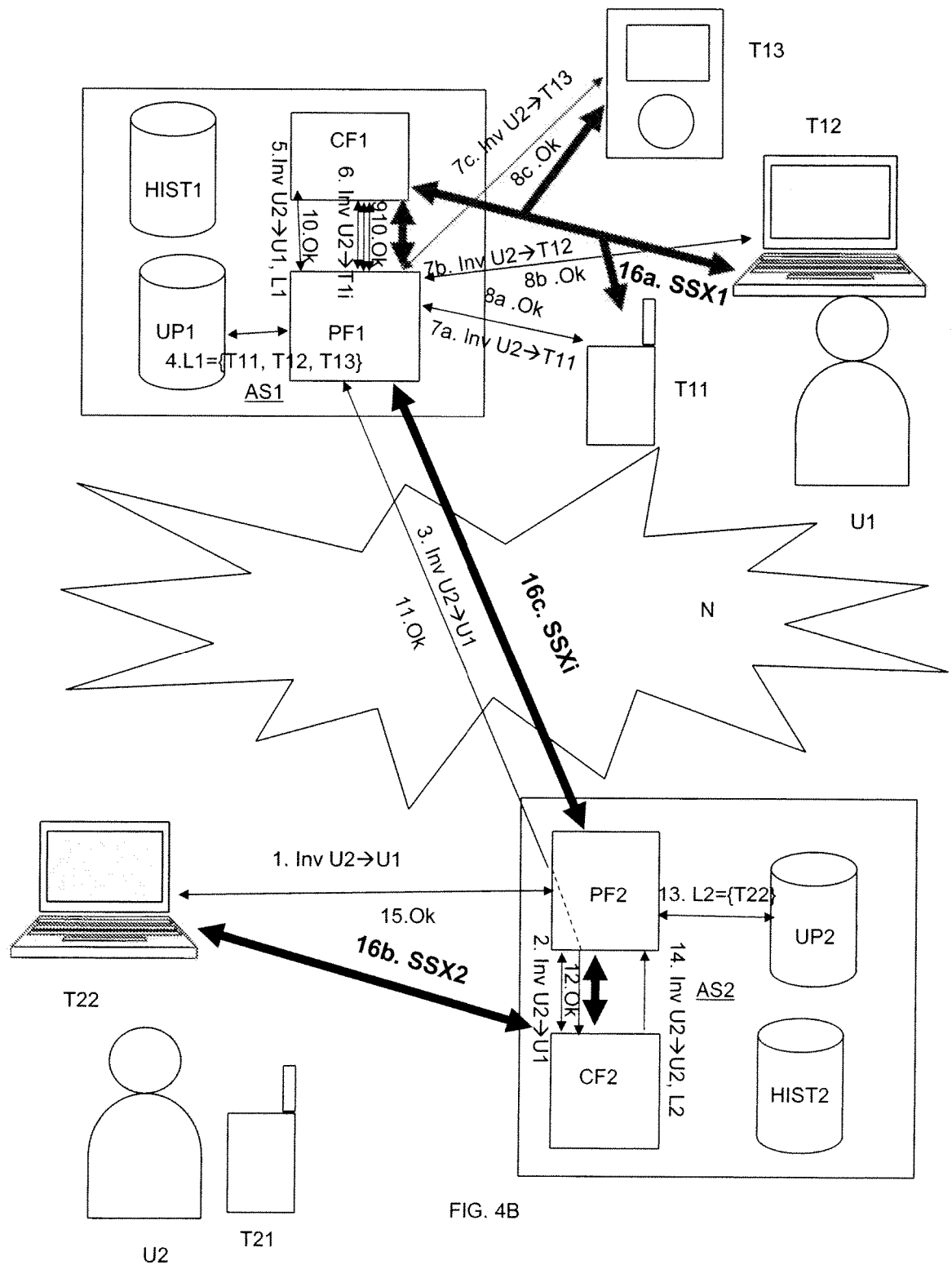
FIG. 4B shows a user U2 using a single terminal setting up a session with a first user U1 using a plurality of terminals, the session being set up by implementing control devices, servers, and terminals of an embodiment of the invention.
Figure 4C:
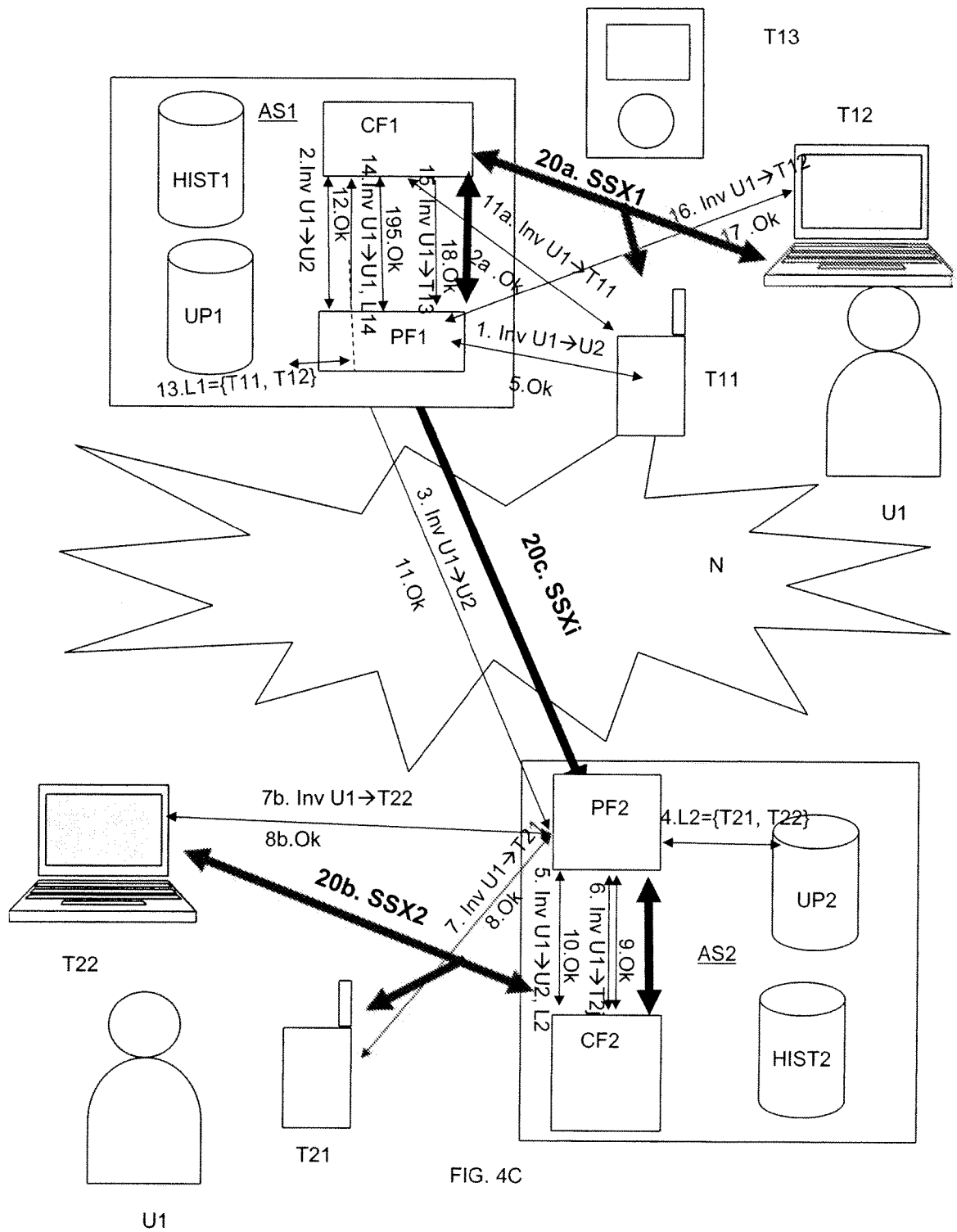
FIG. 4C shows a first user U1 using a plurality of terminals setting up a session with a user U2 also using a plurality of terminals, the session being set up by implementing control devices and participation devices, servers, and terminals of an embodiment of the invention.

FIG. 4B shows the situation in which a second user U2 using a single second terminal T22 enters into communication with a first user U1 using a plurality of first terminals T11, T12, T13.

An invitation 2.inv U2→U1 (in particular a CPM session invitation) is routed from an inviting second server AS2 associated with a second user U2 (in particular a second network serving the inviting CPM user U2) to a first server AS1 associated with an invited first user U1 (in particular a first network serving the invited CPM user U1).

Session Initiation
Inviting Server AS2

In order to set up a messaging session, in particular a CPM 1-1 session, the inviting client, specifically the second terminal T22 of the second user U2 in FIG. 4B (an inviting CPM client) sends an invitation 1.inv U2→U1 to the second server AS2.

In a particular embodiment, a CPM session invitation is sent to a second SIP/IP core device (not shown) serving the inviting second user U2, in particular a second SIP/IP core device of the inviting second server AS2.

In a particular embodiment, the invitation 1.inv U2→U1 that is sent includes characteristics (e.g. a CMP feature tag) about the capabilities and the services of the destination, specifically a first user U1. These characteristics are used by the second server AS2 (in the particular embodiment described above, the second core device) in order to route the invitation to a second participation device PF2 associated with the inviting second user U2. These characteristics are introduced into the invitation by the client, specifically the second terminal T22 of the inviting second user U2.

The invitation 1.inv U2→U1 includes the address of the invited first user U1, e.g. a CPM user or a non-CPM user. This address is introduced into the invitation by the client, specifically the second terminal T22 of the inviting second user U2.

In a particular embodiment, a second participation device PF2 of the second server AS2 receives the invitation 1.inv U2→4U1.

In a particular embodiment, the second participation device PF2 includes means for acting on the basis of the received invitation to determine whether the second participation device PF2 is or is not to continue setting up the session.

In a particular embodiment, the second participation device PF2 includes means for routing to an interworking selection device if interworking is involved in setting up the session, with this being done on the basis of the received invitation. In particular, the routing means are suitable for enabling routing to the interworking selection device via a second SIP/IP core device. Interworking occurs in particular when one of the users does not use the same messaging service: for example the inviting second user U2 may be a CPM user while the destination first user U1 is not.

The second participation device PF2 includes means for routing the received invitation to an invited first user U1 on the basis of the received invitation. In a particular embodiment, the invitation 2.inv U2→U1 is routed via a first SIP/IP core device associated with the invited first user U1.

In a particular embodiment, the second participation device PF2 decides whether or not it remains in the media path for this session. This decision is taken in particular as a function of service provider policies.

Invited Server AS1

The first participation device PF1 of the first server AS1 associated with the invited first user U1 receives the invitation 2.inv U2→U1. In a particular embodiment, a first core device associated with the invited first user U1 routes the invitation 2.inv U2→U1 to the first participation device PF1. This routing is performed in particular on the basis of characteristics (in particular a CPM feature tag) inserted in the invitation.

In a particular embodiment, the first participation device PF1 includes means for verifying the messaging service from which the address of the first user U1 depends on receiving the invitation 2.inv U2→U1.

The first participation device PF1 includes means for acting on the basis of the received invitation to reject the invitation. In a particular embodiment, it is decided to reject an invitation if:

the preferences UP1 of the first user U1 provide for session invitations to be rejected (e.g. on the basis of the originating address, of non-disclosure of the identity of the sender, or of a media stream request); and/or no first terminal is registered, in particular for the type of messaging service specified by the invitation (in particular no registered CPM client for the receiving first user U1).

In a particular embodiment, the first participation device PF1 includes means for verifying the preferences UP1 of the first user U1 on the first terminals to which the invitation is to be routed if a plurality of first terminals are registered.

The first participation device PF1 includes means for modifying an invitation, in particular the received invitation 2.inv U2→U1, and suitable for enabling a session to be set up with a first group of first terminals, said first group being created on the basis of the modified invitation 4.inv U2→U1, L1.

In a particular embodiment, the first participation device PF1 determines which first terminals (in particular CPM clients) are not to receive the invitation as a function of criteria such as, in particular: the media streams offered in the invitation, the capabilities of the first terminals, the preferences of the first user U1, and the service provider policies.

In a particular embodiment, the first participation device PF1 includes means for acting on the basis of the received invitation to determine whether the first participation device PF1 is or is not to continue with setting up the session.

If the session continues to be set up, the first participation device acts as a connection device between messaging servers of two B2BUA operators.

In the example of FIG. 4B, the first participation device PF1 of the invited first user U1 sends the modified invitation 4.inv U2→U1, L1 (e.g. including the addresses of the first terminals T11, T12, and T13, as determined beforehand) to a first control device CF1 of the invited first user U1, in particular via a first SIP/IP core device.

The first control device CF1 includes means for setting up a session with a first group GR1 of first terminals created after receiving the invitation 4.inv U2→U1, L1. In particular, as shown in FIG. 4B, the control device includes means for routing the invitation to each of the first terminals T11, T12, T13 concerned, in particular via the first SIP/IP core device, respectively 5a.inv U2→T11, 5b.inv U2→T12, and 5c.inv U2→T13.

In particular, the first control device CF1 includes means for creating a group of terminals, in particular an ad-hoc group, or for using a predefined group with all of the addresses of the first terminals T11, T12, T13 of the invited first user U1.

In a particular embodiment, the first control device CF1 includes means for acting on the basis of the received invitation to route to an interworking selection device, if necessary for any one of the first terminals T11, T12, T13, in particular if interworking is involved in setting up the session. In particular, the routing means are suitable for routing to the interworking selection device via a first SIP/IP core device.

FIG. 4C shows the situation in which two users are both using a plurality of terminals: a first user U1 using a plurality of first terminals T11, T12 enters into communication with a second user U2 using a plurality of second terminals T21, T22, T13.

An invitation 2.inv U1→U2 (in particular a CPM session invitation) is routed from an inviting first server AS1 associated with a first user U1 (in particular a first network serving the inviting CPM user 1) to a second server AS2 associated with an invited second user U2 (in particular a first network serving the invited CPM user 2).

Session Initiation

Inviting Server AS1

In order to set up a messaging session, in particular a CPM 1-1 session, the inviting client, specifically the first terminal T11 of the first user U1 in FIG. 4C (an inviting CPM client) sends an invitation 1.inv U1→U2 to the first server AS1.

In a particular embodiment, a CPM session invitation is sent to a first SIP/IP core device (not shown) serving the inviting first user U1 (an SIP/IP core serving the inviting CPM client), in particular to a first SIP/IP core device of the inviting first server AS1.

In a particular embodiment, the invitation 1.inv U1→U2 that is sent includes characteristics (e.g. a CMP feature tag) about the capabilities and the services of the destination, specifically of the second user U2. These characteristics are used by the first server AS1 (in the particular embodiment described above, the second core device) for routing the invitation to a first participation device PF1 associated with the inviting first user U1. These characteristics are introduced into the invitation by the client, specifically the first terminal T11 of the inviting first user U1.

The invitation 1.inv U1→U2 includes the address of the invited second user U2, e.g. a CPM user or a non-CPM user. This address is introduced into the invitation by the client, specifically the first terminal T11 of the inviting first user U1.

In a particular embodiment, a first participation device PF1 of the first server AS1 receives the invitation 1.inv U1→U2.

In a particular embodiment, the first participation device PF1 includes means for acting on the basis of the received invitation to determine whether the first participation device PF1 is or is not to continue with setting up the session.

In a particular embodiment, the first participation device PF1 includes means for acting on the basis of the received invitation to route to an interworking selection device if interworking is involved in setting up the session. In particular, the routing means are suitable for enabling routing to the interworking selection device via a second SIP/IP core device. Interworking is involved in particular when one of the users does not use the same messaging service: for example, the inviting first user U1 is a CPM user, while the destination second user U2 is not.

The first participation device PF1 includes means for acting on the basis of the received invitation to route the received invitation to an invited second user U2. In a particular embodiment, the invitation 2.inv U1→U2 is routed via a second SIP/IP core device associated with the invited second user U2.

In a particular embodiment, the first participation device PF1 decides whether or not it is to remain in the media path for this session. This decision is taken in particular as a function of service provider policies.

The first participation device PF1 includes, secondly, means for acting after receiving the invitation to route a modified invitation 10.inv U1→U1, L1 (e.g. including the addresses of the first terminals T11, T12 as determined beforehand) to a first control device CF1 of the inviting first user U1, in particular via a first SIP/IP core device.

In a particular embodiment, the first participation device PF1 includes means for modifying an invitation, in particular a received invitation 1.inv U1→U2, and suitable for enabling a session to be set up with a first group of first terminals, said first group being created on the basis of the modified invitation 10.inv U1→U1, L1.

In a particular embodiment, the first participation device PF1 determines the first terminals (in particular CPM client) that are not to receive the invitation as a function of criteria such as, in particular: the media streams offered in the invitation, the capabilities of the first terminals, the preferences UP1 of the first user, and the service provider policies.

The first control device CF1 includes means for setting up a session with a first group GR1 of first terminals created after receiving the invitation 10.inv U1→U1, L1. In particular, as shown in FIG. 4C, the first control device CF1 includes means for routing the invitation to each of the first terminals T11, T12 concerned, in particular via the first SIP/IP core device, respectively 11a.inv U1→T11, 11b.inv U1→T12.

In particular, the first control device CF1 includes means for creating a group of terminals, in particular an ad-hoc group, or for using a predefined group with all of the addresses of the first terminals T11, T12 of the invited first user U1.

Invited Server AS2

The second participation device PF2 of the second server AS2 associated with the invited second user U2 receives the invitation 2.inv U1→U2. In a particular embodiment, a second core device associated with the invited second user U2 routes the invitation 2.inv U1→U2 to the second participation device PF2. This routing is performed in particular on the basis of characteristics (in particular a CPM feature tag) inserted in the invitation.

In a particular embodiment, the second participation device PF2 includes means for acting on reception of the invitation 2.inv U1→U2 to verify the messaging service from which the address of the second user U2 depends.

The second participation device PF2 includes means for rejecting an invitation on the basis of the received invitation. In a particular embodiment, it is decided to reject an invitation if:

the preferences UP2 of the second user U2 provide for session invitations to be rejected (e.g. on the basis of the originating address, of non-disclosure of the identity of the sender, or of a media stream request); and/or no second terminal is registered in particular for the type of messaging service specified by the invitation (in particular no CPM client registered for the receiving second user U2).

In a particular embodiment, the second participation device PF2 includes means for verifying the preferences UP2 of the second user U2 on the second terminals to which the invitation is to be routed if a plurality of second terminals are registered.

The second participation device PF2 includes means for modifying an invitation, specifically the received invitation 2.inv U1→U2 that are suitable for enabling a session to be set up with a second group of second terminals, said second group being created from the modified invitation 4.inv U1→U2, L2.

In a particular embodiment, the second participation device PF2 determines the second terminals (in particular CPM clients) that are not to receive the invitation as a function of criteria such as, in particular: the media streams offered in the invitation, the capabilities of the first terminals, the preferences of the second user U2, and the service provider policies.

In a particular embodiment, the second participation device PF2 includes means for acting on the basis of the received invitation to determine whether the second participation device PF2 is or is not to continue setting up the session.

If session set up is continued, the second participation device PF2 acts as a connection device between the messaging servers of two B2BUA operators.

In the example of FIG. 4C, the second participation device PF2 of the invited second user U2 sends the modified invitation 4.inv U1→U2, L2 (e.g. including the addresses of the second terminals T21 and T22 as determined beforehand) to a second control device CF2 of the invited second user U2, in particular via a second SIP/IP core device.

The second control device CF2 includes means for setting up a session with a second group GR2 of second terminals created after receiving the invitation 4.inv U1→U2, L2. In particular, as shown in FIG. 4C, the second control device CF2 includes means for routing the invitation to each of the second terminals T21, T22 concerned, in particular via the second SIP/IP core device, respectively 5a.inv U1→T21, 5b.inv U1→T22.

In particular, the second control device CF2 includes means for creating a group of terminals, in particular an ad-hoc group, or for using a predefined group with all of the addresses of the second terminals T21, T22 of the invited second user U2.

In a particular embodiment, the second control device CF2 includes means for acting on the basis of the received invitation to route to an interworking selection device, if necessary for one of the second terminals T21, T22, in particular if interworking is involved in setting up the session. In particular, the routing means are suitable for enabling routing to the interworking selection device via a first SIP/IP core device.

Closing a Session

This stage is not shown in FIGS. 4A to 4C. It involves closing the SSX session that is made up in particular of the first session 14A. SSX1, of the intermediate session 14C. SSXi, and of the second session 14B. SSX2, represented by bold arrows.

In order to close the session, the first or second terminal seeking to close the session, in this example the first terminal T11, sends a closure request (in particular a CPM session leaving request) to the associated participation device, the first participation device PF1. In a particular embodiment, this first request is received by the first SIP/IP core device associated with the requesting terminal.

This closure request uses a signaling path identical to that used by the invitation to set up the session. The first participation device PF1 that is closing the session thus routes the closure request along the same signaling path.

In a particular embodiment, the first SIP/IP core device thus routes the closure request along this signaling path.

The third-party participation device, i.e. the second participation device PF2 in this example, receives the closure request from the first participation device PF1 and routes it over the signaling path.

Modifying a Session

This stage is not shown in FIGS. 4A to 4C. It consists in modifying certain elements of the SSX session, which session is made up in particular of a first session 20A. SSX1, an intermediate session 20C. SSXi, and a second session 20B. SSX2, represented by bold arrows.

These modifications enable a user participating in the session to add a new media stream, to eliminate any existing media stream, or to change the characteristics of an existing media stream.

For example, in order to enable the first user U1 to modify the SSX session, the participation device includes means for modifying the session, and a first terminal T11 includes means for modifying the session, from which terminal the user U1 specifies the modification.

Session modification is performed on entry of the user, specifically the first user U1, or for other reasons, in particular when the first server AS1 detects that the session has been moved to an IP network having a narrower passband.

In order to modify the session, the first terminal seeking to modify the session, in this example the first terminal T11, sends a modification request (in particular a CPM session modification request) to the associated participation device, i.e. the first participation device PF1. In a particular embodiment, this request is received by the first SIP/IP core device associated with the requesting terminal.

This modification request uses a signaling path identical to that used by the invitation to set up the session. The first participation device PF1 that is closing the session thus routes the modification request over the same signaling path.

In a particular embodiment, the first SIP/IP core device thus routes the modification request over the signaling path.

The third-party participation device, i.e. the second participation device PF2 in this example, receives the modification request from the first participation device PF1 and routes it over the signaling path, in particular if the modification request satisfies the user preferences UP2 and/or the service provider policies.

The control device CF1, CF2 is suitable in particular for controlling the session setup invitations for the user, respectively U1 and U2, with whom the control device is associated. It includes in particular means for managing the sending of session setup invitations for the associated user.

A participation device is suitable for managing sessions in the routing sense, e.g. an SIP proxy, for the respective user U1 or U2, with whom the control device is associated. It includes in particular means for conveying session setup invitations for the associated user.

In an embodiment, the architecture does not include a participation device and its functions are performed by means incorporated in the control device CF.

In a particular embodiment, the histories of data exchanges are stored independently of the terminals used. In particular, the histories are stored in storage devices: respectively first and second storage devices HIST1, HIST2, as shown in FIGS. 4A, 4B, and 4C, which devices are placed for example respectively in the first and second servers AS1 and AS2 associated with the first and second users U1 and U2.

In a particular embodiment, the first and second users use the same messaging service, and in particular the same server.

An embodiment of the invention also provides a data medium including a computer program for controlling a session, a data medium including a computer program for participating in a session.

At least one of the data mediums may be any kind of entity or device capable of storing the program. For example, at least one of the mediums may include storage means such as a read-only memory (ROM), e.g. a compact disk (CD) ROM or a microelectronic circuit ROM, or indeed magnetic recording means, e.g. a floppy disk or a hard disk.

Furthermore, at least one of the data mediums may be a transmissible medium such as an electrical or optical signal that may be conveyed via an electrical or optical cable, by radio, or by other means. The program of the invention may in particular be downloaded from a network, in particular of the Internet type.

Alternatively, at least one of the data mediums may be an integrated circuit in which the program is incorporated, the circuit being adapted to execute or to be used in the execution of the method in question.

In another implementation, an embodiment of the invention is implemented by means of software and/or hardware components. In this context, the term "module" may correspond equally well to a software component or to a hardware component. A software component corresponds to one or more computer programs, to one or more subprograms of a program, or more generally to any element of a program or of software that is suitable for implementing a function or a set of functions in accordance with the above description. A hardware component corresponds to any element of hardware that is suitable for implementing a function of a set of functions.

By means of its architecture, an embodiment of the invention may be implemented not only in an architecture of the IMS type, but also in an architecture that makes use of an XMPP type protocol. More generally, an embodiment of the invention does not depend on the communications protocol or the communications architecture used.

An embodiment of the invention presents the advantage of enabling all of the terminals of a group to see that which has been written and sent by any one of the terminals of the group, which is not true of a solution that involves a server setting up two communications branches, one to each of the terminals. Under such circumstances, each of the terminals does indeed receive the messages from the contacts with whom conversation has been established, but in contrast it does not see anything that is written and sent from the other terminal.

Although the present disclosure has been described with reference to one or more examples, workers skilled in the art will recognize that changes may be made in form and detail without departing from the scope of the disclosure and/or the appended claims.

The invention claimed is:

1. A control method of controlling a data exchange session between first terminals of a first user and at least one second terminal of a second user, said data exchange session being a bidirectional communication session, the first user and the second user being distinct, said control method executed by a control device comprising:
after receiving at the control device an invitation to set up a session with said first user from one of the at least one second terminal, creating in the control device a first group of first terminals of the first user suitable for enabling said bidirectional communication session to be set up between the at least one second terminal and said first group;
establishing said bidirectional communication session between said at least one second terminal of the second user and said first group of first terminals of the first user such that when the at least one second terminal of the second user sends data during the session, each of the first terminals of the first user in the first group receives the data sent by the at least one second terminal of the second user and such that when one first terminal belonging to the first group sends data during the session, the at least one second terminal and each of the other first terminals belonging to said first group receive the data sent by the one first terminal belonging to said first group.

2. The control method according to claim 1, wherein said first group comprises a function of a first list of first terminals obtained from said invitation to set up a session as modified by said first list.

3. The control method according to claim 1, wherein said control method includes supplying data received for the first user during the session to the first terminals belonging to said first group.

4. The control method according to claim 1, wherein said method includes displaying data sent by the first user during the session on the first terminals belonging to said first group.

5. The control method according to claim 1, wherein said control method includes managing a history of data exchanges that is independent of the first terminals used by said first user for sending data.

6. A participation method for enabling a first user in a data exchange session between first terminals of a first user and at least one second terminal of a second user, said data exchange session being a bidirectional communication session, the first user and the second user being distinct, said participation method including:
modifying at a control device an invitation to set up a session with said first user, the modification being suitable for enabling said bidirectional communication session to be set up between said at least one second terminal of the second user and a first group of first terminals of said first user such that when the at least one second terminal of the second user sends data during the session, each of the first terminals of the first user in the first group receives the data sent by the at least one second terminal of the second user and such that when one first terminal belonging to said first group sends data during the session, the at least one second terminal and each of the other first terminals belonging to said first group receive the data sent by the one first terminal belonging to said first group, said first group being created from said modified invitation.

7. The participation method according to claim 6, wherein said modification includes the control device substituting an address of the first user with a list of first terminals in said invitation to set up a session with the first user.

8. A non-transmissible computer-readable medium including program code instructions stored thereon for executing steps of a method of controlling a data exchange session between first terminals of a first user and at least one second terminal of a second user, when said program is executed by a processor, said data exchange session being a bidirectional communication session, the first user and the second user being distinct, wherein the method comprises:

after receiving an invitation to set up a session with said first user, creating with the processor a first group of first terminals of the first user suitable for enabling said bidirectional communication session to be set up with said first group;

establishing said bidirectional communication session between said at least one second terminal of the second user and said first group of first terminals of the first user such that when the at least one second terminal of the second user sends data during the session, each of the first terminals of the first user in the first group receives the data sent by the at least one second terminal of the second user and such that when one first terminal belonging to said first group sends data during the session, the at least one second terminal and each of the other first terminals belonging to said first group receive the data sent by the one first terminal belonging to said first group.

9. A non-transmissible computer-readable medium comprising program code instructions stored thereon for executing steps of a participation method for enabling a first user in a data exchange session between first terminals of a first user and at least one second terminal of a second user, when said program is executed by a processor, said data exchange session being a bidirectional communication session, the first user and the second user being distinct, wherein the method comprises:

modifying with the processor an invitation to set up a session with said first user, the modification being suitable for enabling said bidirectional communication session to be set up between said at least one second terminal of the second user and a first group of first terminals of said first user such that when the at least one second terminal of the second user sends data during the session, each of the first terminals of the first user in the first group receives the data sent by the at least one second terminal of the second user and such that when one first terminal belonging to said first group sends data during the session, the at least one second terminal and each of the other first terminals belonging to said first group receive the data sent by the one first terminal belonging to said first group, said first group being created from said modified invitation.

10. A non-transitory computer-readable medium comprising:

preferences of a first user stored thereon, the preferences comprising at least the identifiers of first terminals of said first user and at least one preference rule of said first user associated with an address of said first user and configured to enable a first bidirectional communication session to be set up between said at least one second terminal of the second user and a first group of first terminals of said first user and at least one second terminal of a second user such that when the at least one second terminal of the second user sends data during the bidirectional communication session, each of the first terminals of the first user in the first group receives the data sent by the at least one second terminal of the second user and such that when one first terminal belonging to the first group sends data during the session, the at least one second terminal and each of the other first terminals belonging to said first group receive the data sent by the one first terminal belonging to said first group, said first group being from identifiers of said first terminals as a function of a first preference rule.

11. A device for controlling a data exchange session between first terminals of a first user and at least one second terminal of a second user, said data exchange session being a bidirectional communication session, the first user and the second user being distinct, said control device including:

a control device configured to set up a session with said first user suitable for enabling said bidirectional communication session to be set up between said at least one second terminal of the second user and said a first group of first terminals of the first user such that when the at least one second terminal of the second user sends data during the session, each of the first terminals of the first user in the first group receives the data sent by the at least one second terminal of the second user and such that when one first terminal belonging to said first group sends data during the session, at least one second terminal and each of the other first terminals belonging to said first group receive the data sent by the one first terminal belonging to said first group, said first group being created after receiving an invitation to set up a session with said first user.

12. A participation device for enabling a first user to participate in a data exchange session between first terminals of a first user with at least one second terminal of a second user, said data exchange session being a bidirectional communication session, the first user and the second user being distinct, said participation device comprising:

a control device configured to modify an invitation to set up a session with said first user, said modified invitation being suitable for enabling said bidirectional communication session to be set up between the at least one second terminal of the second user and a first group of first terminals of said first user such that when the at least one second terminal of the second user sends data during the session, each of the first terminals of the first user in the first group receives the data sent by the at least one second terminal of the second user and such that when one first terminal belonging to said first group sends data during the session, the at least one second terminal and each of the first terminals belonging to said first group receive the data sent by the one first terminal belonging to said first group, said first group being created from said modified invitation.

13. A server comprising:

at least a first control device configured to control a data exchange session between first terminals of a first user and at least one second terminal of a second user, said data exchange session being a bidirectional communication session, the first user and the second user being distinct, said first control device acting after receiving an invitation to set up a session with said first user to create a first group of first terminals of the first user suitable for enabling said bidirectional communication session to be set up between said at least one second terminal of the second user and said first group of first terminals of the first user such that when the at least one second terminal of the second user sends data during the session, each of the first terminals of the first user in the first group receives the data sent by the at least one second terminal of the second user and such that when one first terminal belonging to said first group sends data during the session, the at least one second terminal and each of the other first terminals belonging to said first group receive the data sent by the one first terminal belonging to said first group.

14. A terminal of a first user or of a second user and comprising:

connection device configured to send an invitation to set up a data exchange session between the first user and the second user said data exchange session being a bidirectional communication session, the first user and the second user being distinct, and suitable for enabling said bidirectional communication session to be set up between a first group of first terminals of the first user and at least one second terminal of the second user such that when the at least one second terminal of the second user sends data, each of the first terminals of the first user in the first group receives the data sent by the at least one second terminal of the second user and such that when one first terminal belonging to said first group sends data during the session, the at least one second terminal and each of the other first terminals belonging to said first group receive the data sent by the one first terminal belonging to said first group, said first group being created as a result of said invitation being sent.

* * * * *

UNITED STATES PATENT AND TRADEMARK OFFICE
CERTIFICATE OF CORRECTION

PATENT NO. : 9,942,280 B2  
APPLICATION NO. : 13/497676  
DATED : April 10, 2018  
INVENTOR(S) : Katell Henry et al.

Page 1 of 1

It is certified that error appears in the above-identified patent and that said Letters Patent is hereby corrected as shown below:

In the Claims

In Claim 11, Column 22, Line 9, delete "a"

In Claim 11, Column 22, Line 16, insert --the-- after "session,"

Signed and Sealed this  
Twenty-sixth Day of March, 2019

Andrei Iancu  
*Director of the United States Patent and Trademark Office*